United States Patent
Ozaki et al.

(10) Patent No.: US 7,435,169 B2
(45) Date of Patent: Oct. 14, 2008

(54) MUSIC PLAYING APPARATUS, STORAGE MEDIUM STORING A MUSIC PLAYING CONTROL PROGRAM AND MUSIC PLAYING CONTROL METHOD

(75) Inventors: Yuichi Ozaki, Kyoto (JP); Kenji Yamamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 87 days.

(21) Appl. No.: 11/455,641

(22) Filed: Jun. 20, 2006

(65) Prior Publication Data

US 2007/0221046 A1    Sep. 27, 2007

(30) Foreign Application Priority Data

Mar. 10, 2006    (JP) ............................. 2006-065796

(51) Int. Cl.
G10H 7/00 (2006.01)
A63F 13/00 (2006.01)

(52) U.S. Cl. ............................. 463/7; 84/612; 84/636

(58) Field of Classification Search .................. 84/484, 84/477 R, 612, 636, 470 R; 463/7; 434/307 A
See application file for complete search history.

(56) References Cited

U.S. PATENT DOCUMENTS

| 6,855,887 | B1 | 2/2005 | Fox ............................. 174/53 |
| 2001/0015123 | A1* | 8/2001 | Nishitani et al. ............... 84/615 |
| 2003/0205124 | A1* | 11/2003 | Foote et al. .................... 84/608 |
| 2004/0068401 | A1* | 4/2004 | Herre et al. ................... 704/217 |
| 2004/0094019 | A1* | 5/2004 | Herre et al. ................... 84/611 |

FOREIGN PATENT DOCUMENTS

| JP | 08115097 A | * | 5/1996 |
| JP | 2001-215963 | | 8/2001 |
| JP | 2002-116754 | | 4/2002 |

OTHER PUBLICATIONS

McKinney, Martin, & Moelants, Dirk (2004b). "Extracting the perceptual tempo from music." In Proceedings of the 5th International Symposium on Musical Information Retrieval, 2004. Barcelona: Universitat Pompeu Fabru.*
D. Eck. "A tempo-extraction algorithm using an Autocorrelation Phase Matrix and Shannon Entropy." In Proc. International Conference on Music Information Retrieval, MIREX posters, 2005.*
Welcome to West Feedback The Second Set, Video Game Manual, Ahead, Inc. pp. 1-22, 1994.

* cited by examiner

*Primary Examiner*—Lincoln Donovan
*Assistant Examiner*—Andrew R Millikin
(74) *Attorney, Agent, or Firm*—Nixon & Vanderhye P.C.

(57) ABSTRACT

A game apparatus includes a CPU core, and the CPU core executes a music playing game according to a game program. During the game, a player plays a guitar as if he or she plucks the strings displayed on an operation screen while viewing a musical score of a desired music (tune) by utilizing a stick. During playing, the timing of the tempo of the music being played by the player is detected, and when the timing of the head of the quarter note in the detected tempo and the timing at which the player currently plays are coincident, a sound effect such as clapping sound, and the like is output. The volume of the clapping sound is increased when the tempo is stable, and decreased when the tempo is unstable.

9 Claims, 10 Drawing Sheets

MUSIC PLAYING APPARATUS, STORAGE MEDIUM STORING A MUSIC PLAYING CONTROL PROGRAM AND MUSIC PLAYING CONTROL METHOD

CROSS REFERENCE TO RELATED APPLICATION

The disclosure of Japanese Patent Application No. 2006-065796 is incorporated herein by reference.

TECHNICAL FIELD

The exemplary embodiments described herein relate to a music playing apparatus, a storage medium storing a music playing control program, and a music playing control method. More specifically, the exemplary embodiments relate to a music playing apparatus which has an operating means allowing a user to perform an operation input and a storage means storing at least sound data, a storage medium storing a music playing control program, and a music playing control method.

BACKGROUND AND SUMMARY

Conventionally, there are a music game apparatus, a family keyboard, etc. as a music playing apparatus for an entertainment, for example. Such a music playing apparatus involves operating a button and a keyboard to the music (accompaniment) to be played, and determining a score and an evaluation according to a timing of the operation.

Also, one example of the related art is disclosed in a Japanese Patent Laying-open No. 2001-215963 [G10H 1/053, A63F 13/00, G09B 15/00, G10H 1/00] (document 1) laid-open on Aug. 10, 2001. In document 1, a music playing apparatus is disclosed in which a player simulates conducting an orchestra and the player swings an operating portion as a baton to thereby control a music playing state (tempo, volume). This enables the player to have a sense of engaging in playing the music.

In addition, another example of the related art is disclosed in a Japanese Patent Laying-open No. 2002-116754 [G10G 3/04] (document 2) laid-open on Apr. 19, 2002. A tempo extracting apparatus in document 2 takes a part of a sound signal provided in the form of an audio signal by a CD, broadcasting, etc. as an input signal, calculates an autocorrelation function of the input sound signal, and extracts a tempo of the sound signal on the basis of the calculation result.

However, in the conventional music playing apparatus, a button and a keyboard are operated to the music, and therefore, it is impossible for the player himself to enjoy playing the music. The same is true for the technique disclosed in document 1, and the player merely has a sense of engaging in playing the music, resulting in less entertaining element. Furthermore, in the technique disclosed in document 2, a tempo of the sound signal such as a CD, broadcasting is merely extracted, and the tempo played by the user is not extracted, and therefore, it is difficult to apply the technique to the music playing apparatus played by the user.

Therefore, it is an aspect of certain exemplary embodiments to provide a novel music playing apparatus, storage medium storing a music playing control program, and music playing control method.

Another aspect of certain exemplary embodiments is to provide a music playing apparatus, a storage medium storing a music playing control program, and a music playing control method which are able to enhance enjoyment of playing.

Certain exemplary embodiments adopt the following features in order to solve the above-described problems. It should be noted that the reference numerals inside the parentheses, supplement, etc. only show one example of a correspondence with the embodiment to be described later in order to aid the understanding of the present invention, and do not limit the present invention.

A music playing apparatus according to certain exemplary embodiments has an operating means allowing a user to perform an operation input and a storage means storing at least sound data. The music playing apparatus comprises a playing sound output means, a history storing means, a playing tempo detecting means, a determining means, and a specific sound output means. The playing sound output means outputs a sound being played on the basis of the sound data stored in the storage means in response to an operation input from the operating means. The history storing means stores a history of the operation input from the operating means in the storage means. The playing tempo detecting means detects a tempo being played on the basis of the history of the operation inputs over a predetermined period. The determining means determines whether or not the playing tempo detected by the playing tempo detecting means and a current operation input have a predetermined relationship. The specific sound output means outputs sound data corresponding to a specific sound stored in the storage means when it is determined to have the predetermined relationship by the determining means.

More specifically, the music playing apparatus (10) has an operating means (22, 24) allowing a user to perform an operation input and a storage means storing at least sound data (42). The music playing game apparatus comprises a playing sound output means (34, 36a, 36b, 48, S7), a history storing means (34, 42, S11), a playing tempo detecting means (34, S13), a determining means (34, S23, S25), and a specific sound output means (34, 36a, 36b, 48, S27). The playing sound output means outputs a sound being played on the basis of the sound data stored in the storage means in response to an operation input from the operating means. That is, the sound according to a playing by the user is output. The history storing means stores a history of the operation input from the operating means in the storage means. For example, a presence or absence of the operation input is stored every constant time period from the start of playing. The playing tempo detecting means detects a tempo being played on the basis of the history of the operation inputs over a predetermined period. The determining means determines whether or not the playing tempo detected by the playing tempo detecting means and a current operation input have a predetermined relationship. The specific sound output means outputs sound data corresponding to a specific sound stored in the storage means when it is determined to have the predetermined relationship by the determining means.

For example, a sound effect cheering up the playing is output. According to certain exemplary embodiments, a user can play what he or she wants, and depending on an evaluation whether or not the tempo of the playing sound and the current operation input have a predetermined relationship, a sound effect such as a clapping sound is output, enhancing an entertaining element.

In one aspect of certain exemplary embodiments, the playing tempo detecting means includes a history comparing means for comparing, more than once, a first history of the operation inputs over a predetermined period and a second history obtained by shifting the first history by a delayed time calculated according to a predetermined rule every different delayed time, and as to a comparison result of the history comparing means, the playing tempo is detected on the basis of the delayed time as to the second history having the highest degree of coincidence with the first history. More specifically, the history comparing means (34, S43, S45, S47, S51) compares, more than once, a first history of the operation inputs over the predetermined period before and a second history obtained by shifting the first history by a delay time calculated according to a predetermined rule every different delayed time. In this comparison result, the playing tempo is detected on the basis of the delayed time as to the second history having the highest degree of coincidence with the first history. That is, the playing tempo is specified by calculating an autocorrelation as to the timing of an operation input by the user. Thus, there is no need to play accompanying of a tune, and this enables the user himself to enjoy playing.

In one embodiment, the determining means determines whether or not the timing of the head of the quarter note in the playing tempo detected by the playing tempo detecting means and the timing of a current operation input are coincident or approximately coincident with each other. More specifically, the determining means determines whether or not the timing of the head of the quarter note in the playing tempo detected by the playing tempo detecting means and the timing of a current operation input are coincident or approximately coincident with each other. That is, it is determined whether or not a phase shifting (shift length) between the timing of the head of the quarter note in the playing tempo and the timing of the current operation input is within a constant range. Accordingly, a specific sound can be output only at a desired timing such as a timing of the head of the quarter note.

Another embodiment further comprises a playing tempo storing means for storing the playing tempo detected by the playing tempo detecting means in the storage means; a playing tempo change determining means for determining whether or not the playing tempo stored by the playing tempo storing means continues within a constant range; and a specific sound changing means for changing the specific sound when the determination result by the playing tempo change determining means is affirmative. More specifically, the music playing apparatus comprises a playing tempo storing means (34, S15), a playing tempo change determining means (34, S17), and a specific sound changing means (34, S19, S21). The playing tempo storing means stores the playing tempo detected by the playing tempo detecting means in the storage means. That is, the history of the playing tempo is recorded. The playing tempo change determining means determines whether or not the playing tempo continues within a constant range. For example, if the difference between the currently detected playing tempo and the previously detected playing tempo is within a constant range, it is determined that the playing tempo is stable, and if not so, it is determined that the playing tempo is unstable. The specific sound changing means changes the specific sound on the basis of a determination result of the playing tempo change determining means. For example, the volume of the specific sound is changed, another specific sound is output, and so forth. Thus, if the tempo is stable, a specific sound is changed to add other performances such as cheering up the playing, capable of adding an entertainment element.

A storage medium storing a music playing control program according to certain exemplary embodiments stores a music playing control program of a music playing apparatus having an operating means allowing a user to perform an operation input and a storage means storing at least sound data. The music playing control program causes a processor of a music playing apparatus as a playing sound output means, a history storing means, a playing tempo detecting means, a determining means, and a specific sound output means. The playing sound output means outputs a playing sound on the basis of the sound data stored in the storage means in response to the operation input from the operating means. The history storing means stores a history of the operation inputs from the operating means in the storage means. The playing tempo detecting means detects a tempo being played on the basis of the history of the operation inputs over a predetermined period. The determining means determines whether or not the playing tempo detected by the playing tempo detecting means and a current operation input have a predetermined relationship. The specific sound output means outputs sound data corresponding to a specific sound stored in the storage means when it is determined to have the predetermined relationship by the determining means.

In the exemplary embodiment of the storage medium storing a music playing control program also, similarly to the above-described music playing apparatus, it is possible to enhance the entertaining element.

A music playing control method according to certain exemplary embodiments is a music playing control method of a music playing apparatus having an operating means allowing a user to perform an operation input and a storage means storing at least sound data. The music playing control method includes next steps of (a) outputting a playing sound on the basis of the sound data stored in the storage means in response to an operation input from the operating means, (b) storing a history of the operation inputs from the operating means in the storage means, (c) detecting a playing tempo on the basis of the history of the operation inputs over a predetermined period, (d) determining whether or not the playing tempo detected by the step (c) and a current operation input have a predetermined relationship, and (e) outputting sound data corresponding to a specific sound stored in the storage means when it is determined to have the predetermined relationship by the step (d).

In the exemplary embodiment of the music playing control method also, similarly to the above-described music playing apparatus, it is possible to enhance the entertaining element.

The above described and other features, aspects and advantages of the present invention will become more apparent from the following detailed description of the present invention when taken in conjunction with the accompanying drawings.

DETAILED DESCRIPTION

Figure 1:
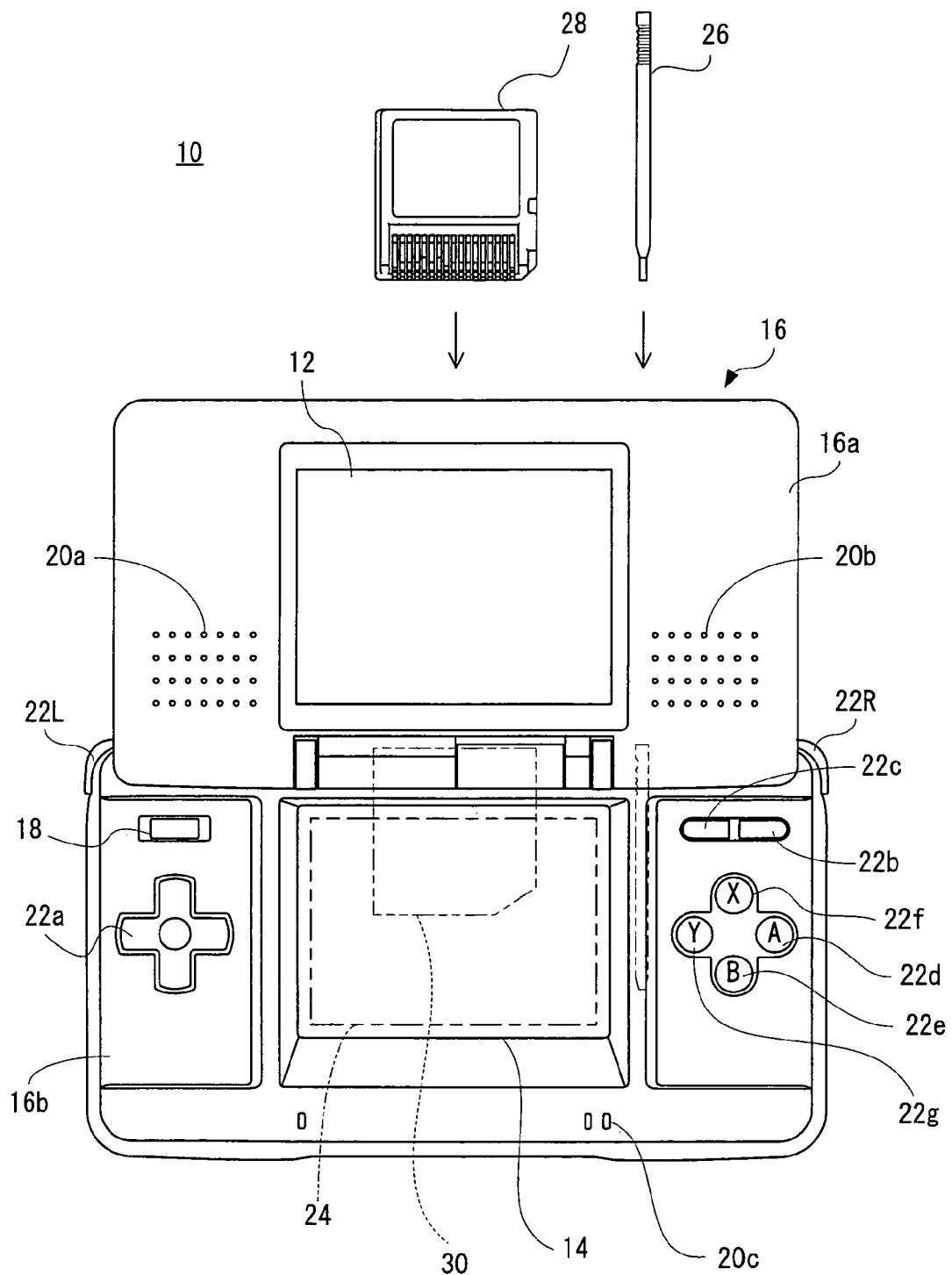
FIG. 1 is an illustrative view showing one embodiment of a game apparatus.

Referring to FIG. 1, a game apparatus 10 of an exemplary embodiment is integrated with a music playing control program to thereby function as a music playing apparatus. The game apparatus 10 includes a first liquid crystal display (LCD) 12 and a second LCD 14. The LCD 12 and the LCD 14 are provided on a housing 16 so as to be arranged in a predetermined position in the housing. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It should be noted that although the LCD is utilized as a display in this embodiment, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. A power switch 18 is provided at the left of the LCD 14 of the lower housing 16b.

Furthermore, on the upper housing 16a, sound releasing holes 20a and 20b for speakers 36a and 36b (FIG. 2) are formed by sandwiching the LCD 12 from side to side. Then, on the lower housing 16b, a microphone hole 20c for a microphone (not illustrated) is formed, and operating switches 22 (22a, 22b, 22c, 22d, 22e, 22L and 22R) are provided.

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

The operating switch 22 includes a direction instructing switch (cross switch) 22a, a start switch 22b, a select switch 22c, an action switch (A button) 22d, an action switch (B button) 22e, an action switch (X button) 22f, an action switch (Y button) 22g, an action switch (L button) 22L, and an action switch (R button) 22R. The switch 22a is arranged at the left of the LCD 14 on one surface of the lower housing 16b. Other switches 22b-22g are arranged at the right of the LCD 14 on the one surface of the lower housing 16b. In addition, the switch 22L and the switch 22R are arranged at the right and left corners sandwiching the connected portion with the upper housing 16a on the upper side surface of the lower housing 16b.

The direction instructing switch 22a functions as a digital joystick, and is utilized for instructing a moving direction of a player character (or player object) to be operated by a user or a player and instructing a moving direction of a cursor, and so forth by operating any one of four depression portions. Also, a specific role (chord of the guitar in this embodiment) can be assigned to each of the four depression portions, and by operating any one of the four depression portions, it is possible to instruct (designate) the assigned role.

The start switch 22b is formed by a push button, and is utilized for starting (restarting), temporarily stopping (pausing) a game, and so forth. The select switch 22c is formed by the push button, and utilized for a game mode selection, etc.

The action switch 22d, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 22e, that is, the B button is formed by the push button, and is utilized for changing a game mode selected by the select switch 22c, canceling an action determined by the A button 22d, and so forth.

The action switch 22f, that is, the X button and the action switch 22g, that is, the Y button are formed by the push button, and are utilized for a subsidiary operation when the game cannot be advanced only with the A button 22d and the B button 22e. It should be noted that the X button 22f and the Y button 22g can be used for the similar operation to the A button 22d and B button 22e. Of course, the X button 22f and the Y button 22g are not necessarily utilized in the game play.

The action switch (left depression button) 22L and the action switch (right depression button) 22R are formed by the push button, and the left depression button (L button) 22L and the right depression button (R button) 22R can perform the same operation as the A button 22d and the B button 22e, and also function as a subsidiary of the A button 22d and the B button 22e. In addition, the L button 22L and the R button 22R can change the roles assigned to the direction switch 22a, the A button 22d, the B button 22e, the X button 22f, and the Y button 22g to other roles. In this embodiment, when the L button 22L is depressed, the chord assigned to the direction switch 22a is changed to another chord.

Also, on a top surface of the LCD 14, a touch panel 24 is provided. As the touch panel 24, any one of kinds of a resistance film system, an optical system (infrared rays system) and an electrostatic capacitive coupling system, for example, can be utilized. In response to an operation (touch input) by depressing, stroking, touching, and so forth with a stick 26, a pen (stylus pen), or a finger (hereinafter, referred to as "stick 26, etc.") on a top surface of the touch panel 24, the touch panel 24 detects a coordinates of an operated position of the stick 26, etc. (that is, touched) to output coordinates data corresponding to the detected coordinates.

It should be noted that in this embodiment, a resolution of the display surface of the LCD 14 (the same is true for the LCD 12) is 256 dots×192 dots, and a detection accuracy of the touch panel 24 is also rendered 256 dots×192 dots in correspondence to the resolution of the display surface. However, the detection accuracy of the touch panel 24 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, characters such as a map, a player character, etc. are displayed on the one LCD, and items belonging to the player character may be displayed on the other LCD. Furthermore, a game play screen may be displayed on the one LCD (LCD 12 in this embodiment), and a game screen (operation screen) including an operating object such as a line, a figure (including an icon) for operating the game may be displayed on the other LCD (LCD 14 in this embodiment). Furthermore, by utilizing the two LCD 12 and LCD 14 as one screen, it is possible to display a large monster (enemy character) to be defeated by the player character.

Accordingly, the player is able to point (operate) an image such as a player character, an enemy character, an item character, an operating object, etc. to be displayed on the LCD 14 and select commands by operating the touch panel 24 with the use of the stick 26, etc. Also, it is possible to change the direction of a virtual camera (viewpoint) provided in the three-dimensional game space, and instruct (input) a scrolling (gradual moving display) direction of the game screen (map).

It should be noted that depending on the kind of the game, other input instructions can be made with the use of the touch panel 24. For example, it is possible to input a coordinates input instruction, and input texts, numbers, symbols, etc. by hand on the LCD 14.

Thus, the game apparatus 10 has the LCD 12 and the LCD 14 as a display portion of two screens, and by providing the touch panel 24 on an upper surface of any one of them (LCD 14 in this embodiment), the game apparatus 10 has the two screens (12, 14) and the operating portions (22, 24) of two systems.

In addition, in this embodiment, the stick 26 can be housed in the housing portion (shown by dotted lines in FIG. 1) provided on the lower housing 16b, for example, and taken out as necessary. It should be noted that if the stick 26 is not provided, the housing portion also need not to be provided.

Also, the game apparatus 10 includes a memory card (or cartridge) 28. The memory card 28 is detachable, and inserted into a loading slot 30 (shown by dotted lines in FIG. 1) provided on a rear surface or a lower edge (bottom surface) of the lower housing 16b. Although omitted in FIG. 1, a connector 32 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 34 (see FIG. 2) of the game apparatus 10.

It should be noted that although not illustrated in FIG. 1, the speakers 36a and 36b (see FIG. 2) are provided at a position corresponding to sound release holes 20a and 20b inside the upper housing 16a.

Furthermore although omitted in FIG. 1, for example, a battery accommodating box is provided on a rear surface of the lower housing 16b, and a volume switch, an external expansion connector, an earphone jack, etc. are provided on a bottom surface of the lower housing 16b.

Figure 2:
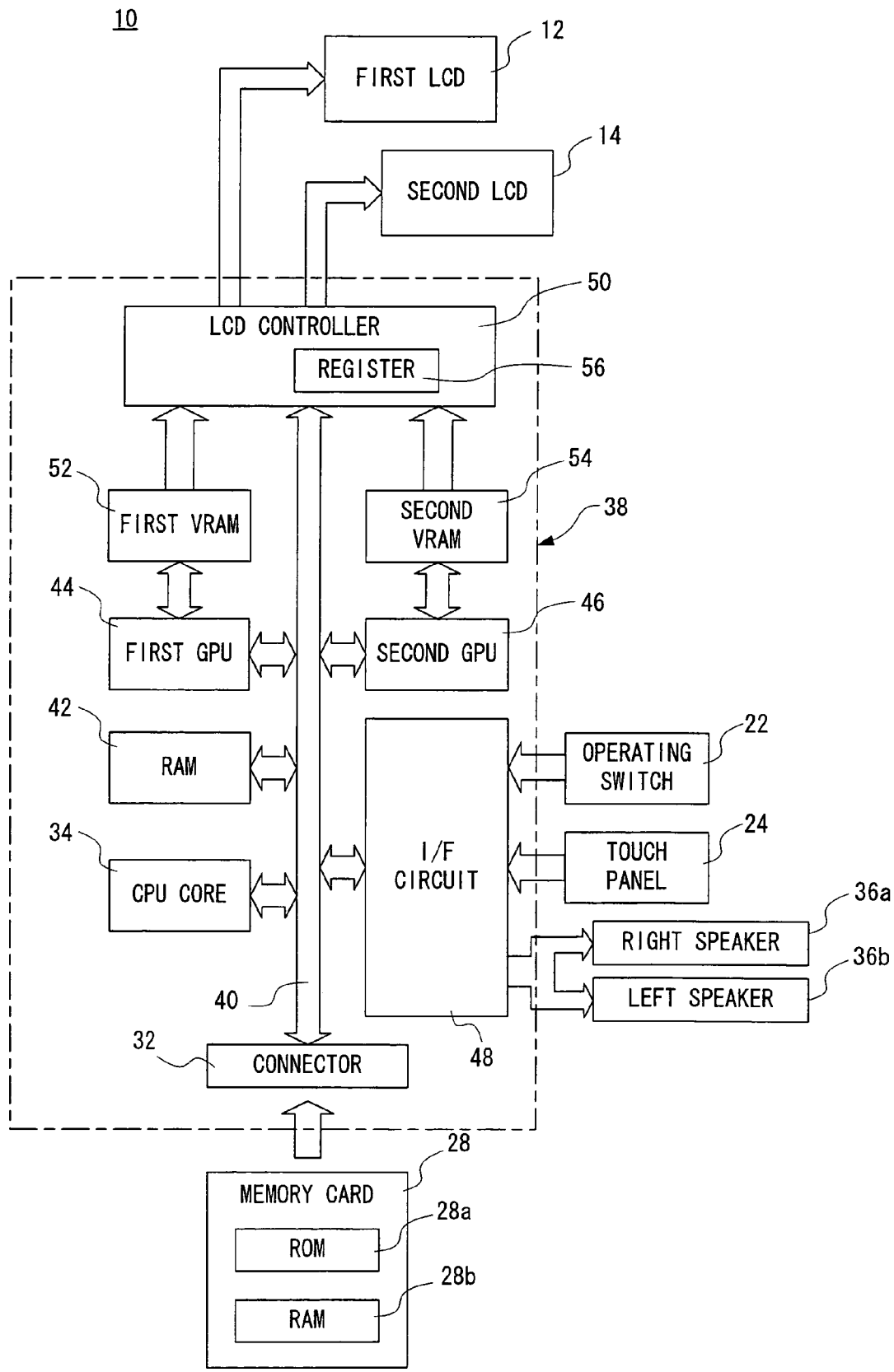
FIG. 2 is a block diagram showing an electric configuration of the game apparatus shown in FIG. 1.

FIG. 2 is a block diagram showing an electrical configuration of the game apparatus 10. Referring to FIG. 2, the game apparatus 10 includes an electronic circuit board 38, and on the electronic circuit board 38, a circuit component such as a CPU core 34, etc. is mounted. The CPU core 34 is connected to the above-described connector 32 via a bus 40, and is connected with a RAM 42, a first graphics processing unit (GPU) 44, a second GPU 46, an input-output interface circuit (hereinafter, referred to as "I/F circuit") 48, and an LCD controller 50.

The connector 32 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 32. Accordingly, the CPU core 34 gains access to the ROM 28a and the RAM 28b as described above.

The ROM 28a stores in advance a game program for a game (music playing game) to be executed by the game apparatus 10, image data (text and character image, background image, item image, icon (button) image, message image, etc.), data of the sound (music) necessary for the game (sound data), etc. The RAM (backup RAM) 28b stores (saves) proceeding data of the game, result data of the game, etc.

The RAM 42 is utilized as a buffer memory or a working memory. That is, the CPU core 34 loads the program, the image data, the sound data, etc. stored in the ROM 28a of the memory card 28 into the RAM 42, and executes the loaded game program. The CPU core 34 executes a game process while storing data (game data, flag data, etc.) generated or obtained in correspondence with a progress of the game in the RAM 42.

It should be noted that the game program, the image data, the sound data, etc. are stored (loaded) from the ROM 28a entirely at a time, or partially and sequentially so as to be stored into the RAM 42.

However, a program as to an application except for the game and image data required to execute the application may be stored in the ROM 28a of the memory card 28. In addition, sound (music) data may be stored therein as necessary. In such a case, in the game apparatus 10, the application is executed.

Each of the GPU 44 and the GPU 46 forms a part of a rendering means, is constructed by, for example, a single chip ASIC, and receives a graphics command from the CPU core 34 to generate image data according to the graphics command. It should be noted that the CPU core 34 applies an image generation program (included in the game program) required to generate the image data to both of the CPU 44 and GPU 46 in addition to the graphics command.

Furthermore, the GPU 44 is connected with a first video RAM (hereinafter referred to as "VRAM") 52, and the GPU 46 is connected with a second VRAM 54. The GPU 44 and the GPU 46 respectively access the first VRAM 52 and the second VRAM 54 to obtain necessary data (image data: character data, texture data, etc.) necessary for executing the graphics command.

It should be noted that the CPU core 34 writes image data necessary for rendering to the first VRAM 52 and the second VRAM 54 via the GPU 44 and the GPU 46. The GPU 44 accesses the VRAM 52 to create image data for rendering, and the GPU 46 accesses the VRAM 54 to create image data for rendering.

The VRAM 52 and the VRAM 54 are connected to the LCD controller 50. The LCD controller 50 includes a register 56, and the register 56 consists of, for example, one bit, and stores a value of "0" or "1" (data value) according to an instruction of the CPU core 34. The LCD controller 50 outputs the image data created by the GPU 44 to the LCD 12, and outputs the image data created by the GPU 46 to the LCD 14 in a case that the data value of the register 56 is "0". On the other hand, the LCD controller 50 outputs the image data created by the GPU 44 to the LCD 14, and outputs the image data created by the GPU 46 to the LCD 12 in a case that the data value of the register 56 is "1".

It should be noted that the LCD controller 50 can directly read the image data from the VRAM 52 and the VRAM 54, or read the image data from the VRAM 52 and the VRAM 54 via the GPU 44 and the GPU 46.

The I/F circuit 48 is connected with the operating switch 22, the touch panel 24 and the speakers 36*a*, 36*b*. Here, the operating switch 22 is the above-described switches 22*a*, 22*b*, 22*c*, 22*d*, 22*e*, 22L and 22R, and in response to an operation of the operating switch 22, a corresponding operation signal (operation data) is input to the CPU core 34 via the I/F circuit 48. Furthermore, the coordinates data output from the touch panel 24 is input to the CPU core 34 via the I/F circuit 48. In addition, the CPU core 34 reads from the RAM 42 the sound data necessary for the game such as a game music (BGM), a sound effect or voices of a game character (onomatopoeic sound), etc., and outputs it from the speakers 36*a*, 36*b* via the I/F circuit 48.

Figure 3:
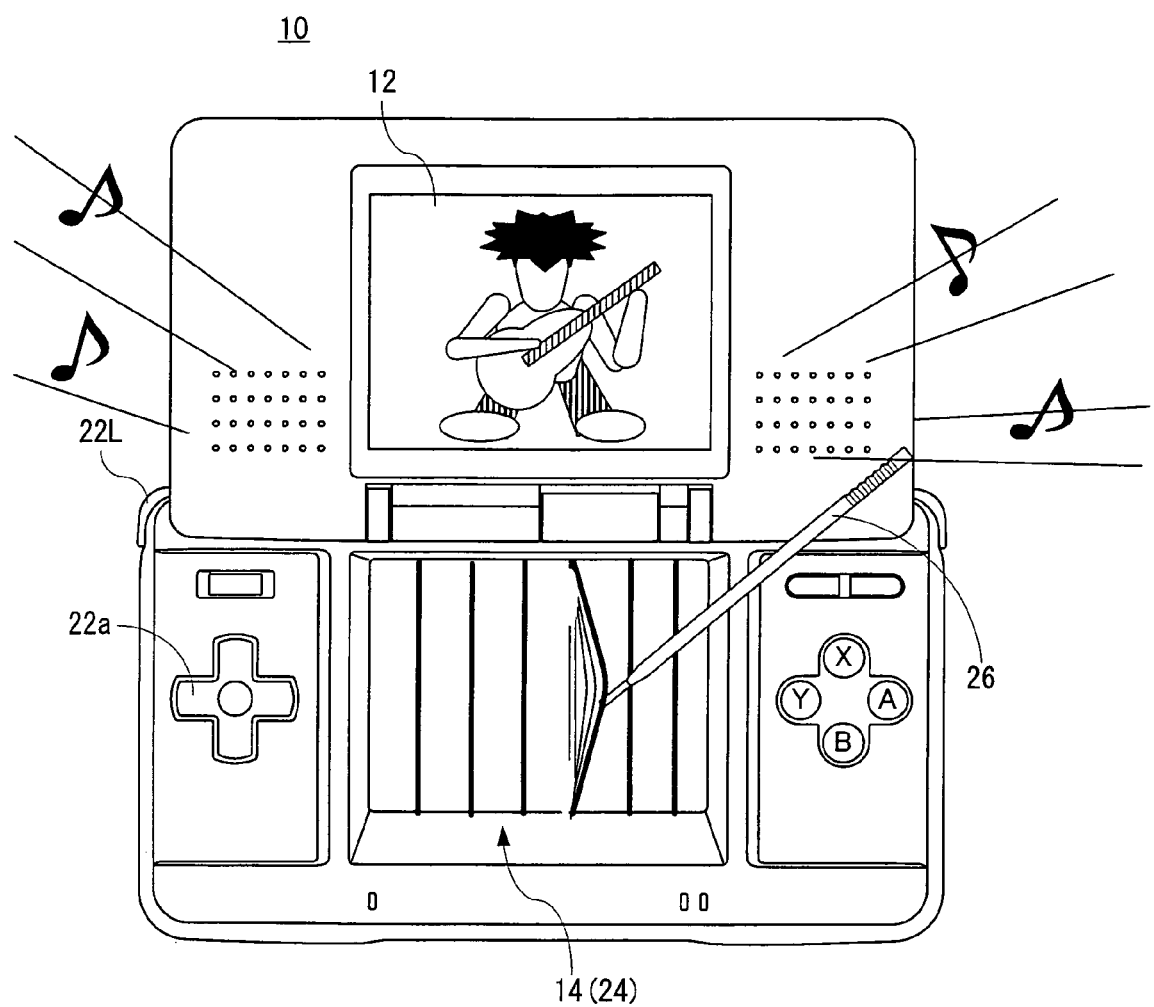
FIG. 3 is an illustrative view showing a state in which a music playing game is played by the game apparatus shown in FIG. 1 as one example.

FIG. 3 mainly shows a game screen, an operation screen, and so on if the game in this embodiment is played by utilizing the game apparatus 10 shown in FIG. 1 and FIG. 2. For example, in this embodiment, a player can simulate playing a guitar. As shown in FIG. 3, on the LCD 12, a game screen including a player character which plays the guitar is displayed, and on the LCD 14, a game screen (operation screen) including an operating object imitating the guitar strings is displayed. Although illustration is omitted, the player holds the game apparatus 10 with his left hand such that the switch 22*a* is operated with his left thumb and the L button 22L is operated with his left index finger. Also, the player holds the stick 26 with his right hand in order to act as if he plucks the strings with the right hand.

Although illustration is omitted, in this embodiment, every time that the L button 22L is depressed, a mode (mode 1, mode 2, for example) can be switched. A desired chord can be assigned to each depressing portion of the direction switch 22*a* as to each of the mode 1 and the mode 2. Accordingly, a useable chord can be changed depending on the tune to be played or during playing the tune by switching the mode. It should be noted that the mode can be three or more.

It should be noted that although not illustrated in FIG. 3, the player character can be animation-displayed.

In this embodiment, bearing a right-handed player in mind, a chord is assigned to each of the depressing portion of the direction switch 22*a* to switch of the mode by the L button 22L. It should be noted that in a case of the left-handed player, a chord may be assigned to each of the A button 22*d*, the B button 22*e*, the X button 22*f* and the Y button 22*g* to switch the mode by the R button 22R. This may be made by the player.

For example, if the player simulates playing a guitar with the game apparatus 10, the player slides the stick 26 on the LCD 14 (touch panel 24) as if he or she plucks one or a plurality of strings (operating object). Then, according to the sliding operation, the strings on the operation screen are plucked. At this time, the sound of the plucked strings is output from the speakers 36*a*, 36*b*. It should be noted that as described above, when the player operates any one of the depression portions of the direction switch 22*a*, the chord assigned to the depression portion is selected. Accordingly, when the player plucks all the strings for making a sound of a chord in a state that the chord is selected, the sound of the chord is output from the speakers 36*a*, 36*b*.

In a case of playing the music by utilizing a conventional music playing apparatus such as a music game apparatus, a family keyboard, etc., a player operates buttons, keyboards, and the like accompanying of a rhythm. Depending on whether or not the operation timing is to the tune, scores and evaluations are decided. Also, in a music playing apparatus capable of conducting an orchestra, a player swings an operating portion as a baton to thereby control a performance state (tempo, volume) of the music.

However, in such a music playing apparatus, the player can sense that he or she is engaged on the performance of the music playing, but cannot obtain enjoyment of playing the game by himself, resulting in a less entertainment element.

Here, in this embodiment, a tempo (playing tempo) of the music (tune) played by the player is detected, and if timing of the start of the quarter note defining the tempo and the played timing (timing of the touch input) are coincident or approximately coincident with each other, a sound effect (specific sound) such as a clapping sound is output. In addition, if the tempo is stable, the volume of the sound effect is increased to cheer up the performance. On the contrary, if the tempo is unstable, the volume of the sound effect is decreased. That is, an entertainment element is added to the game.

More specifically, the player simulates playing a guitar by utilizing a game apparatus 10 while viewing a musical score as to a desired music (tune), for example. When a performance is started, a sound effect such as cheers is output, giving the player a sense of realism as if he or she actually plays on a stage, and so forth. During the performance, the timing (touch input) at which the player plucks the operating object (strings) is detected, and the history is recorded in a time series. In this embodiment, as described later, a playing tempo of the music to be played by the player is detected for each frame (frame: screen update per unit of time (1/60 seconds)), and in view of computing power, the history of the touch inputs (touch input history) is recorded by the number of frames corresponding to three seconds.

Figure 4:
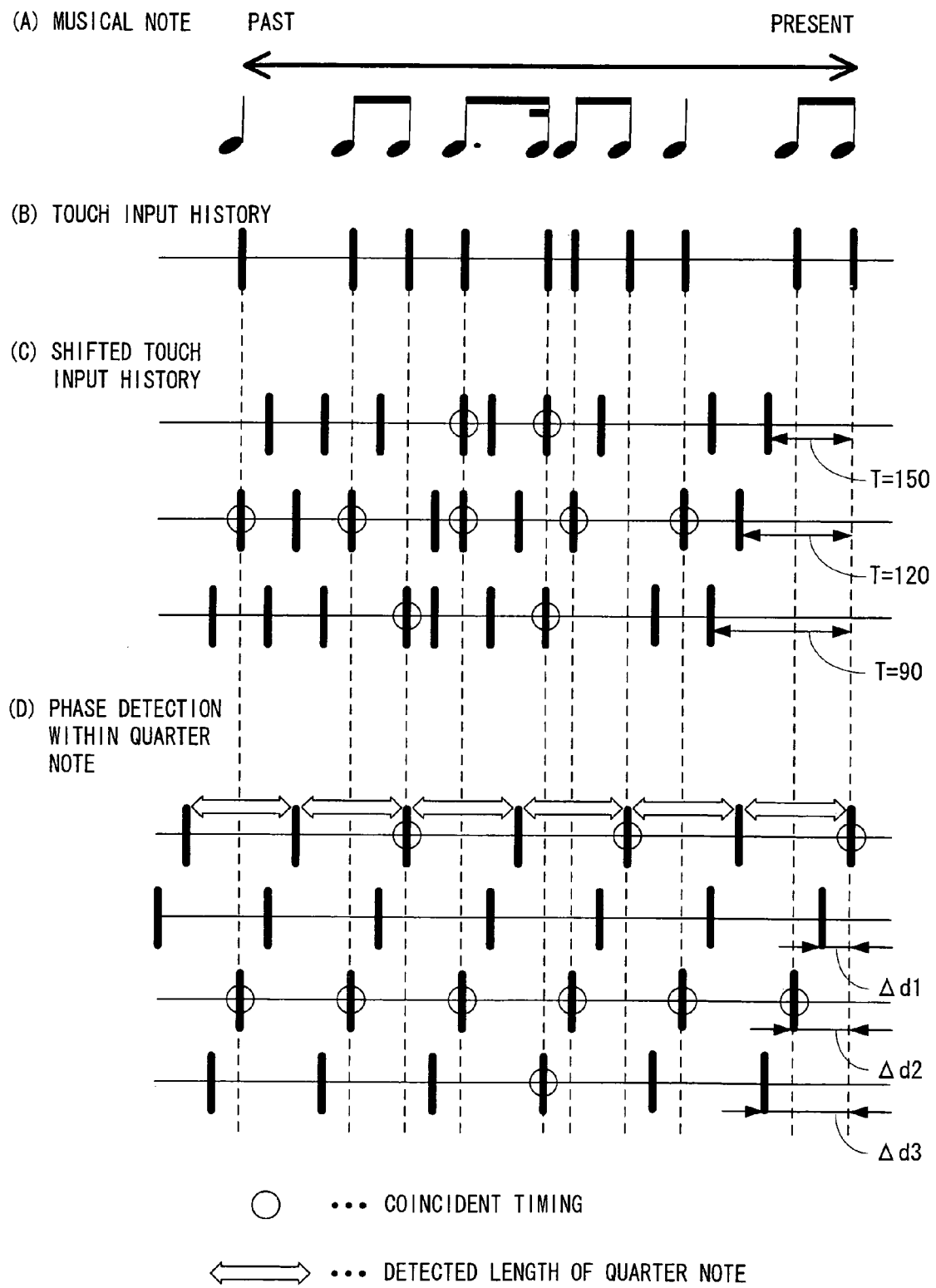
FIG. 4 is an illustrative view for describing how to detect a played tempo when a music playing game is played and how to detect a phase within the quarter note in the tempo.

For example, if the player plays the guitar according to the musical note (ignoring a musical interval and a chord) as shown in FIG. 4 (A), assuming that the history (touch input history) shown in FIG. 4 (B) is obtained. It should be noted that in FIG. 4, each of the timings is represented by a vertical line as if a touch input is instantly made, but one touch input actually has a width of several frames. This is because that as shown in FIG. 3, at a time of playing the guitar, the player slides the stick 26 such that he or she plucks one or the plurality of strings.

By utilizing the touch input history, a playing tempo of the music to be played by the player is detected. More specifically, the touch input history is compared with an input history shifted by a quarter note in each of the tempos T (150-90 in this embodiment) (calculate an autocorrelation function), and the tempo T having a high degree of coincidence (high correlation) is detected as a played tempo.

For example, FIG. 4 (C) example shows the touch input history (hereinafter, to be referred to as "delayed history", for the sake of convenience of description) is obtained by shifting (delaying) the touch input history (hereinafter, to be referred to as "original history", for the sake of convenience of description) shown in FIG. 4 (B) in each of the tempos T 150, 120, 90. As shown in FIG. 4 (C), when the original history and the delayed history are compared, if the tempo T is 150, the timing when the original history and the delayed history are coincident is two. Also, if the tempo T is 120, the timing when the original history and the delayed history are coincident is five. In addition, if the tempo T is 90, the timing when the original history and the delayed history are coincident is two. That is, if the tempo T is 120, it may be said that the correlation between the original history and the delayed history is the highest.

It should be noted that for simplicity, although a description is made on the three delayed histories in FIG. 4 (C), the tempo T is added by one from 90 to 150 to compare the original history with each of the delayed histories.

Additionally, in FIG. 4 (C) (the same is true for FIG. 4 (D) described later), the coincidence between the original history and the delayed history (the head of the quarter note in FIG. 4) is represented by a circular mark.

It should be noted that strictly speaking, the number of timings when the original history and the delayed history are coincident is not detected, but an autocorrelation function (correlation value) is calculated to detect the tempo T having the largest correlation value (evaluated value) v1 as a played tempo. Here, the correlation value v1 is calculated according to the autocorrelation function shown in the equation 1.

$$v1=v1+h[t]\times h[t+a]$$

$a$=the number of frames in one minute/the number of quarter notes in one minute (tempo)

$$t=0-(\text{HIST\_TIME}-A\_\text{MAX}-1) \quad [\text{Equation 1}]$$

It should be noted that the default value of the correlation value v1 is 0, h[ ] is a touch input history (for three seconds in this embodiment), a is a tempo cycle, the HIST_TIME is a historical time (the number of frames corresponding to three seconds), and A_MAX is the a (tempo cycle) when the tempo T is 90. This is true for the following description.

It should be noted that the reason why the degree of coincidence between the original history and the delayed history is detected by calculating the correlation is that each touch input has a width of several frames. Accordingly, in a case of playing other musical instrument such as a percussion instrument by utilizing the game apparatus 10, since an input timing has not width, it is difficult to calculate a correlation as described above. In such a case, the Gaussian distribution (normal distribution) is obtained by taking the input timing as the center to give a certain degree of width to the input timing.

As described above, the tempo T having the highest correlation is specified as a played tempo. The history of the specified played tempo is recorded, and if the played tempo is stable, the volume of the sound effect is increased. On the contrary, if the played tempo is unstable, the volume of the sound effect is decreased. If the time lag between the currently detected tempo being played and the previously detected played tempo is within a predetermined value (5 tempos in this embodiment), it is determined that the played tempo is stable, and if the time lag exceeds the predetermined value, it is determined the played tempo is unstable.

In addition, if the tempo being played is specified, a phase shift within the quarter note is detected. In other words, a shift length (phase shifting) between the timing of the current touch input (playing) and the timing corresponding to the head of the quarter note in the specified played tempo is detected. This is because that if the current touch input is performed at a timing corresponding to the head of the quarter note or a timing approximately thereto, the performance is cheered up by playing a sound effect such as a clapping sound, and the like.

More specifically, an impulse function of an interval (quarter note interval) corresponding to the length of the quarter note in the specified played tempo is generated. Then, the correlation between the original history and the played tempo if the generated impulse function is shifted from the current frame by one frame is detected. That is, a phase shifting between the timing played by the player and the timing of the specified played tempo is detected, and in a case of less phase shifting with the played timing, a sound effect is output.

Here, an impulse function which is "1" only in the head of the quarter note of the specified played tempo, and is "0" in other positions is generated. The correlation between the touch input history and the impulse function is detected by shifting the impulse function by one frame. More specifically, a correlation value v2 is calculated according to the equation 2.

$$v2=v2+h[t]$$

$$t=b-(\text{HIST\_TIME}-\text{best\_}a+b)$$

$$b=0-\text{best\_}a-1 \quad [\text{Equation 2}]$$

It should be noted that the default value of the correlation value v2 is 0, and the best_a is the tempo cycle a when the correlation value v1 is maximum, and the b is the number of frames of the phase shifting.

For example, in FIG. 4 (D), the impulse function which is not phase shifted and the impulse functions which are phase shifted by the number of frames corresponding to Δd1, Δd2, Δd3. It should be noted that in FIG. 4 (D), the length of the quarter note in the specified played tempo is shown by an outline arrow. As can be understood from FIG. 4 (B) and FIG. 4 (D), the highest degree of coincidence with the touch input history (original history) can be obtained when the phase of the impulse function at the quarter note intervals is shifted by the number of frames corresponding to Δd2.

It should be noted that the timing of the head of the quarter notes in a case that the phase of the played tempo T is shifted by the number of frames corresponding to Δd2 is relatively largely shifted from the timing of the current touch input. FIG. 4 (D) example shows that the phase is shifted by the length corresponding to the half of the quarter note (the length of the eighth note). Although it is difficult in the drawings, in such a case, if the phase shifting is out of a constant range (5 frames before and after, for example), a sound effect is not output.

It should be noted that as shown in FIG. 4 (B) and FIG. 4 (D), the timing of the touch input directly before the current touch input and the timing of the impulse function at quarter note intervals are coincident or approximately coincident. Although it is difficult in the drawings, in such a case, the phase shifting is within the constant range, a sound effect is output.

Furthermore, the number of outputs of the clapping sound is counted, and if the number of outputs of the clapping sound is equal to or more than the constant number (30, in this embodiment), a sound effect such as cheers is output when the player ends the playing. This is because that a sound effect such as cheers is output after completion of paying to give the player a sense of realism as if he or she plays on the stage, and so on.

Figure 5:
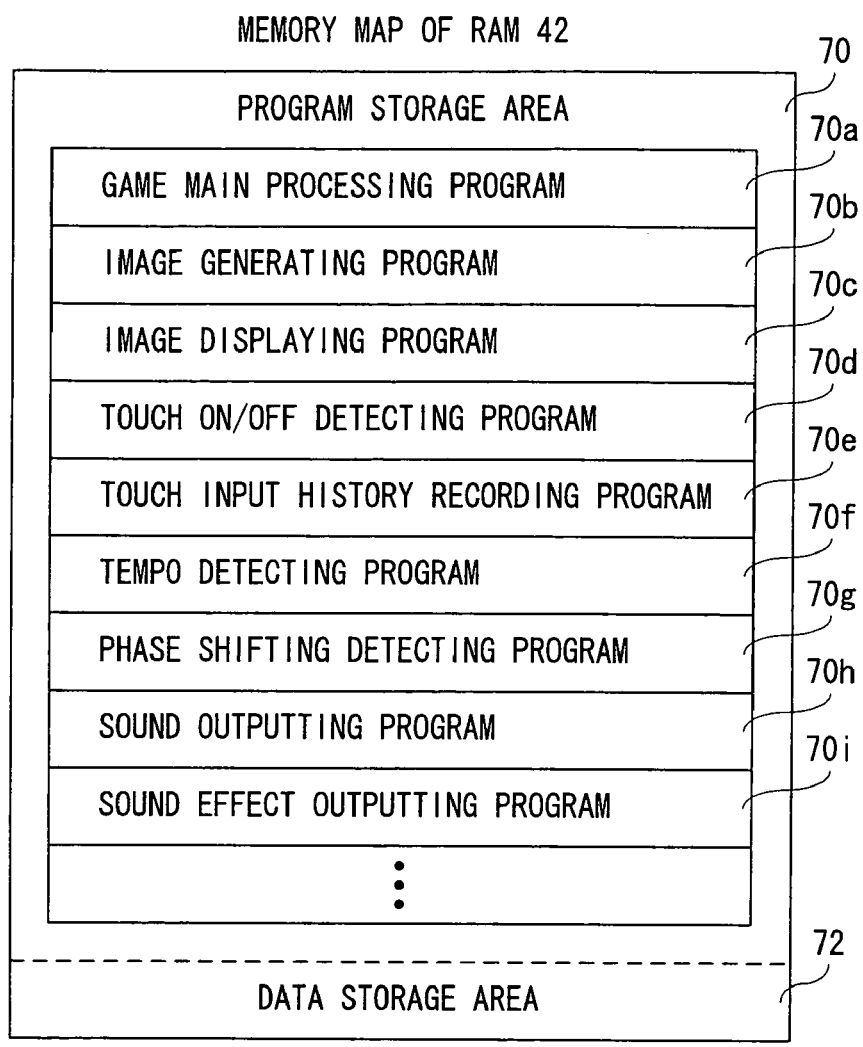
FIG. 5 is an illustrative view showing one example of a memory map of a RAM shown in FIG. 2.

FIG. 5 shows a memory map of the RAM 42 shown in FIG. 2. Referring to FIG. 5, the RAM 42 includes a program storage area 70 and a data storage area 72. In the program storage area 70, a music playing control program (game program) is stored. For example, the game program includes a game main processing program 70*a*, an image generating program 70*b*, an image displaying program 70*c*, a touch on/off detecting program 70*d*, a touch input history recording program 70*e*, a tempo detecting program 70*f*, a phase shifting detecting program 70*g*, a sound outputting program 70*h*, a sound effect outputting program 70*i*, etc.

The game main processing program 70*a* is a program for executing a main processing on the game (music playing game) in this embodiment. The image generating program 70*b* is a program for generating a game image (game screen and operation screen). More specifically, the image generating program 70b is a program for generating a game screen including a player character, a musical instrument object to be used by the player character, and a background object, and generating an operation screen including an operating object such as guitar strings.

The touch on/off detecting program 70d is a program for detecting a touch-on operation shifting from a state in which the player does not touch the touch panel 24 (no-touch-input state) to the touch-on state in which the player touches the touch panel 24 (touch-input state), and a program for detecting the touch-off operation shifting from the touch-on state to the touch-off state. Also, according to the touch on/off detecting program 70d, the CPU core 34 turns (establish or dose not establish) a touch-on flag 72a (see FIG. 6) described later on/off. The CPU core 34 turns the touch-on flag 72a on when a touch input is present, and turns the touch-on flag 72a off when a touch input is absent.

The touch input history recording program 70e is a program for recording a history of the touch input (touch on operation) in a time series according to the touch on/off detecting program 70d from the time when the player starts playing to the time when he or she stops playing. That is, according to the touch input history recording program 70e, the CPU core 34 records touch input history data 72b (see FIG. 6) described later in the data storage area 72. It should be noted that in this embodiment, as described above, the tempo is detected by utilizing the touch input history corresponding to the number of frames of three seconds including the current frame. Thus, the touch input history recording program 70e rejects timing of the touch input corresponding to the frame, the timings of touch inputs corresponding to the frames three seconds before.

The tempo detecting program 70f is a program for comparing the touch input history with the touch input histories which are shifted by the length of the quarter note in each tempo T (150-90), and specifying, as a result of the comparison, the tempo T having the highest degree of coincidence as a played tempo. That is, an autocorrelation function of the touch input history is calculated, and the tempo T having the highest correlation is specified as a played tempo. The phase shifting detecting program 70g is a program for detecting a shift length (phase shifting) between the played tempo detected according to the tempo detecting program 70f and the touch input history.

The sound outputting program 70h is a program for outputting a sound according to the playing by the player. That is, when the player executes an operation to pluck the strings, a guitar sound is output in response thereto. The sound effect outputting program 70i is a program for outputting a sound effect such as a clapping sound, cheers, and the like. For example, when the player starts playing, or during the player plays, a clapping sound is output at the constant number of times or more, and after the player ends the playing, cheers are output. If the timing of the head of the quarter note in the specified played tempo and the timing played (touch input) by the player are coincident or approximately coincident with each other (the phase shifting is within 5 frames in this embodiment), the clapping sound is output. As described above, the volume of the clapping sound is increased if the tempo is stable, and it is decreased if the tempo is unstable.

It should be noted that, although illustration is omitted, in the program storage area 70, a backup program, etc. are stored. The backup program is a program for storing (saving) in the RAM28b the game data (proceeding data and result data of the game) according to the player's instruction and a predetermined event.

Figure 6:
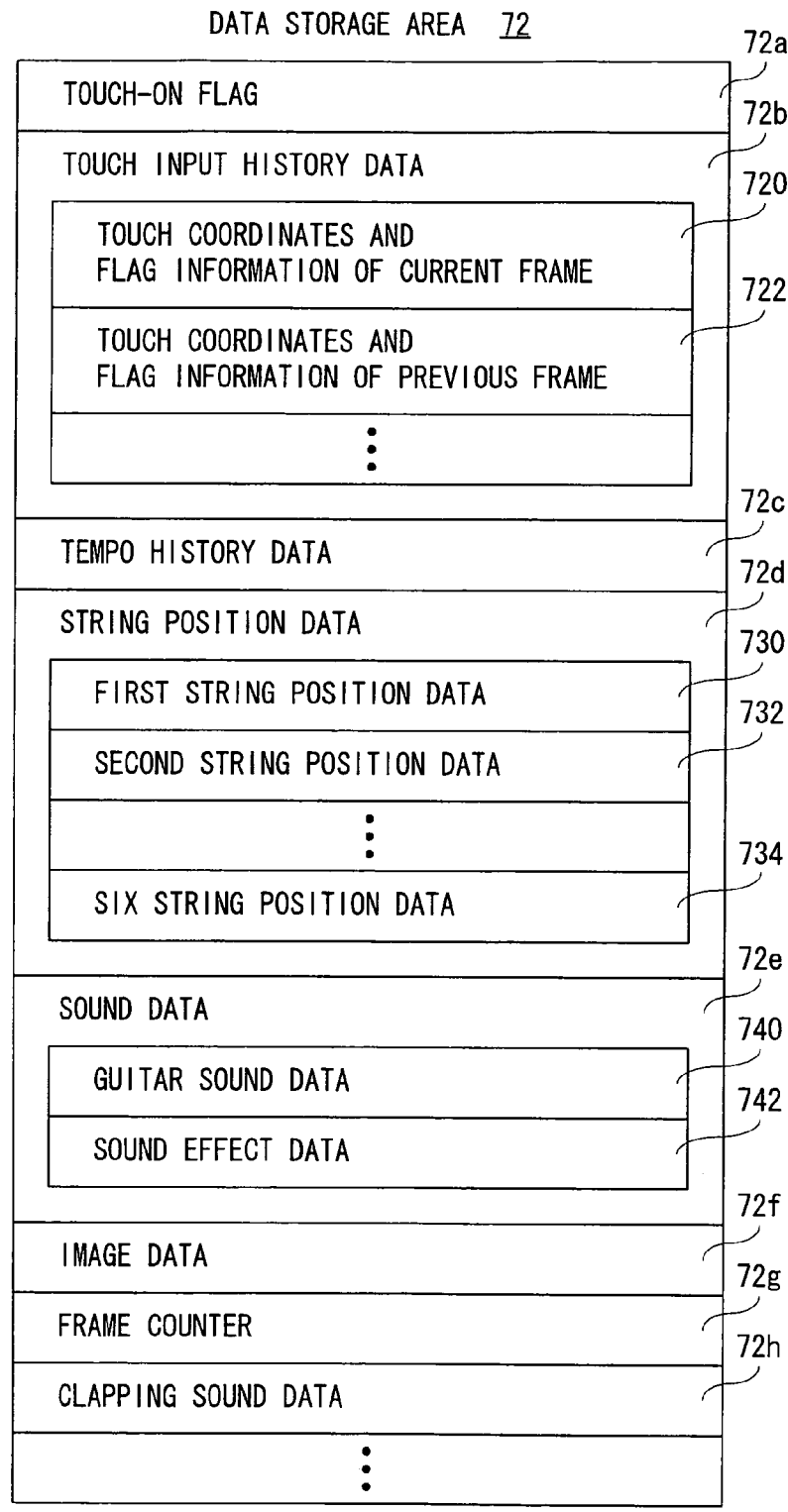
FIG. 6 is an illustrative view showing one example of a data storage area shown in FIG. 5.

FIG. 6 is an illustrative view showing one example of the data storage area 72 of the RAM 42. Referring to FIG. 6, in the data storage area 72, the touch-on flag 72a, the touch input history data 72b, tempo data 72c, string position data 72d, sound data 72e, image data 72f, etc. are stored.

The touch-on flag 72a is a flag for determining a presence or absence of the touch input, and turned on/off according to the touch on/off detecting program 70d as described above. For example, the touch-on flag 72a comprises 1 bit register, and when the flag is turned on, a data value "1" is stored in the register, and on the contrary thereto, when the flag is turned off, a data value "0" is stored in the register.

The touch input history data 72b is data as to the touch input history. It should be noted that the touch input history data 72b stores data (720, 722, . . . ) corresponding to each frame of the past three seconds at the maximum including the current frame. Here, the touch input history means the touch coordinates and the touch on/off information of the touch-on flag 72a (flag information) in each frame. It should be noted that if the touch-on flag 72a is turned off, this means no touch input, and therefore, the touch coordinates is not stored.

The tempo history data 72c is data for storing in a time series the played tempo calculated for each frame until the current frame. The string position data 72d is data (730, 732, 734, etc.) for displaying the operating object (strings) on the LCD 14 (operation screen). More specifically, a display position (coordinates in a horizontal direction (X coordinate)) of each of the strings (first string, second string, . . . , sixth string) on the LCD 14 is stored. Also, the string position data 72d is utilized for determining whether or not each of the strings is plucked by the player. More specifically, when the player touches the touch panel 24 with the stick 26 and then slides the stick 26 as it is, the difference between the X coordinate (X coordinate represented by the string position data 72d) of the display position of the string which bends according to the movement of the stick 26 and the X coordinate of the current touch position exceeds a fixed value (10 dots, for example), it is determined that the string is plucked.

The sound data 72e includes guitar sound data 740 and sound effect data 742. The guitar sound data 740 stores sound data corresponding to each string of the guitar. Accordingly, a sound corresponding to a musical scale and a sound according to a chord is generated and output by utilizing the sound data corresponding to each string. Also, the sound effect data 742 is data as to a sound effect such as a clapping and cheers. The image data 72f is data (character data, texture data, etc.) for generating an image to respectively display the game screen and the operation screen on the LCD 12 and the LCD 14.

Furthermore, the data storage area 72 includes a frame counter 72g, a clapping sound counter 72h, etc. The frame counter 72g is a counter for counting the number of frames from the start of the playing. The clapping sound counter 72h is a counter for counting the number of outputs of the clapping sound during playing by the player.

It should be noted that although illustration is omitted, in the data storage area 72, other game data, flag data, etc. are stored, and other counters are also provided.

Figure 7:
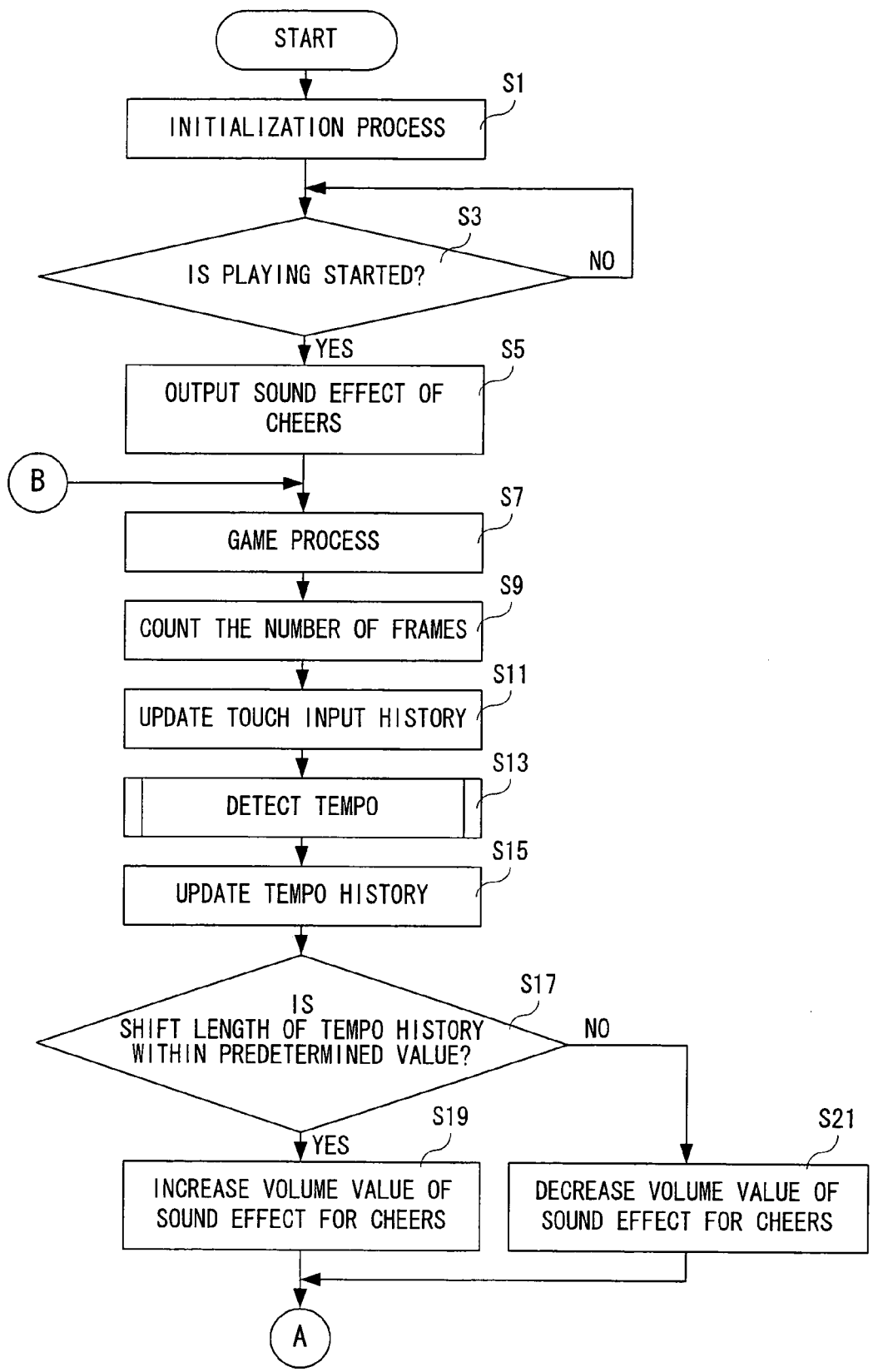
FIG. 7 is a flowchart showing a part of a music playing process of the CPU core shown in FIG. 2.
Figure 8:
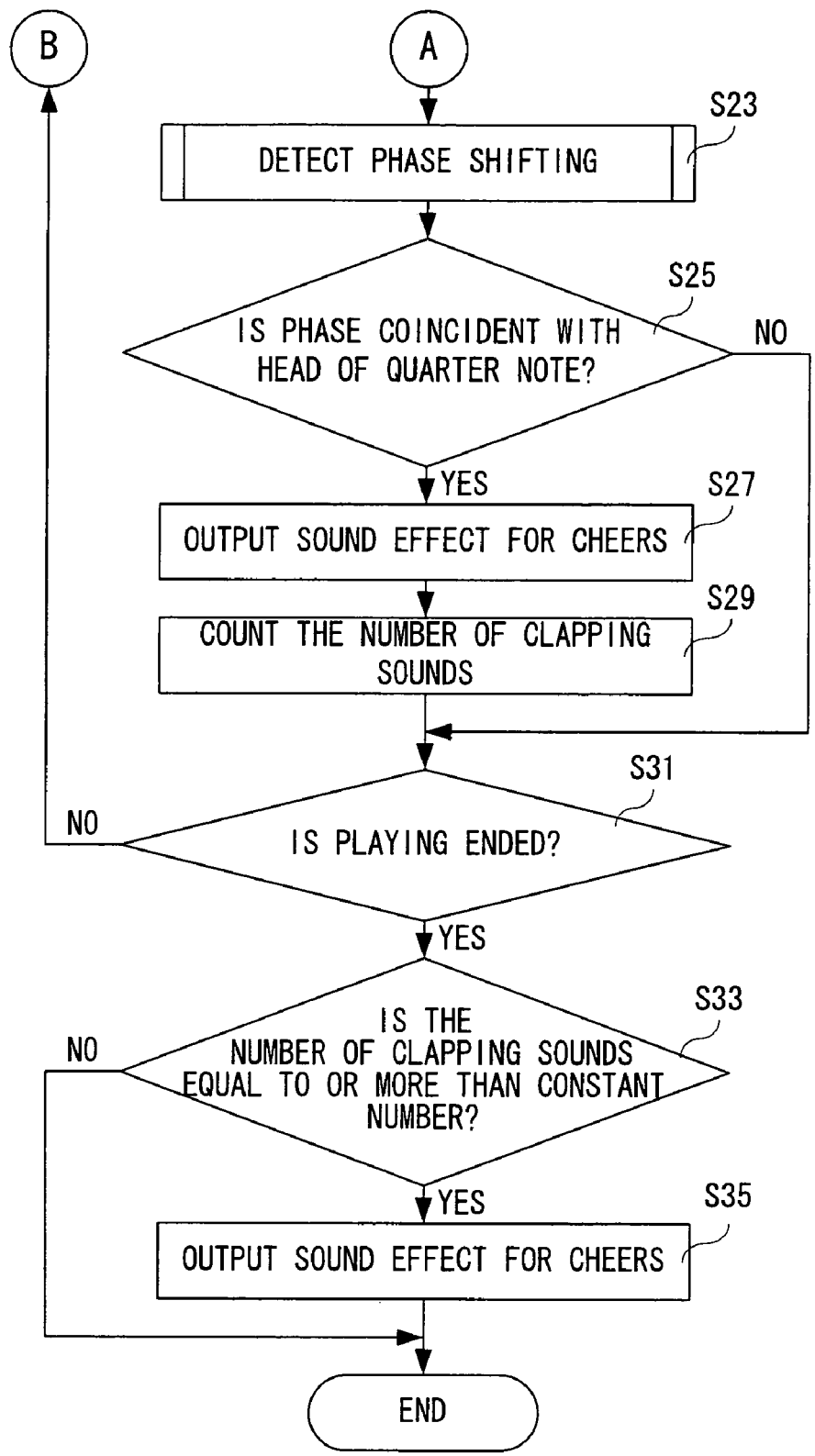
FIG. 8 is a flowchart showing another part of the music playing process of the CPU core shown in FIG. 2, and continued from FIG. 7.

More specifically, the CPU core 34 shown in FIG. 2 executes a music playing process according to the flowchart shown in FIG. 7 and FIG. 8. As shown in FIG. 7, at a start of the music playing process, the CPU core 34 executes an initialization process in step S1. Here, for example, the frame counter 72g and the clapping sound counter 72h are reset. That is, a count value is set to 0. In step S3, it is determined whether or not the player starts playing. That is, it is determined whether or not a touch input has been detected since the music playing game was started.

If "NO" in step S3, that is, if the player does not start playing, the process returns to step S3. On the other hand, if "YES" in step S3, that is, if the player starts playing, a sound effect of cheers is output in step S5. Here, the CPU core 34 reads the sound effect data 742 as to the cheers from the data storage area 72, and outputs it from the right speaker 36a and the left speaker 36b via the I/F circuit 48. The same is true for a case that a sound effect is output.

In step S7, a game processing is executed. Here, an operation input by the player (button operation and touch input) is detected, a game screen of the LCD 12 is displayed (updated), and the operation screen of the LCD 14 is displayed according to a touch input by the player. Also, a guitar sound is output according to the operation input by the player. Here, the operation input by the player is made only by a touch input, and by a button operation (operation of the direction switch 22a) and a touch input. Accordingly, a single sound and a sound of chord corresponding to the plucked string (s) are output. Here, the CPU core 34 reads the guitar sound data 742 corresponding to the plucked string from the data storage area 72, and outputs it from the right speaker 36a and the left speaker 36b via the I/F circuit 48. In addition, according to an operation of the L button 22L, a mode is switched.

In succeeding step S9, the number of frames is counted. That is, the frame counter 72g is incremented. Here, in the flowchart shown in FIG. 7 and FIG. 8, a scan time in steps S7-S31 is one frame, and during the playing, the scan time is added (counted) by one frame every time the process in step S7 is executed, and the number of frames from the start of the playing is counted.

In step S11, a touch input history is updated. According to the touch input detected in step S7, the data of the touch coordinates and the flag information are stored in the data storage area 72. That is, the touch input history data 72b is updated. It should be noted that if a touch input is absent, the touch coordinates is not stored.

After updating the touch input history, a tempo detecting process (see FIG. 9) described later is executed in step S13, and a tempo history is updated in step S15. That is, the numerical value data of the tempo being played currently detected by the tempo detecting process is stored (added) in the data storage area 72 to update the tempo history data 72c.

Then, in step S17, it is determined whether or not the shift length of the tempo history is within a predetermined value (five tempos, for example). More specifically, the CPU core 34 determines whether or not the difference (of the absolute value) between the currently detected tempo and the previously detected tempo is within a predetermined value. If "YES" in step S17, that is, if the shift length of the tempo history is within the predetermined value, it is determined that the tempo being played is stable, and a volume value of the sound effect (clapping sound, for example) for cheers is increased in step S19, and then, the process proceeds to step S23 shown in FIG. 8. On the other hand, if "NO" in step S17, that is, if the shift length of the tempo history exceeds a predetermined value, it is determined that the tempo being played is unstable, and the volume value of the sound effect for cheers is decreased in step S21, and the process proceeds to step S23.

As shown in FIG. 8, in step S23, a phase shifting detecting process (see FIG. 10) within the quarter note described later is executed. That is, the CPU core 34 determines whether or not it is a timing to output a sound effect for cheers. In step S25, it is determined whether or not the phase is the timing of the head of the quarter note. That is, the CPU core 34 determines whether or not the phase shifting between the current frame (playing timing) and the timing of the head of the quarter note is within the fixed range (5 frames, for example).

If "NO" in step S25, that is, if the phase is not the timing of the head of the quarter note, the process directly proceeds to step S31. On the other hand, if "YES" in step S25, that is, if the phase is the timing of the head of the quarter note, a sound effect for cheers, that is, clapping sounds is output in step S27, and the number of clapping sounds (the number of outputs) is counted, that is, the clapping sound counter 72h is incremented in step S29, and then, the process proceeds to step S31.

In step S31, it is determined whether or not the playing is ended. Here, the CPU core 34 determines whether or not the music playing end instruction is input. It should be noted that a timer for counting a no-touch-input time is provided, and if the timer counts a constant time (ten seconds, for example), it is determined that the playing is ended.

If "NO" in step S31, that is, if the playing is not ended, the process returns to step S7 shown in FIG. 7. However, if "YES" in step S31, that is, if the playing is ended, it is determined whether or not the number of outputs of the clapping sound is equal to or more than the constant number of times (30, for example) in step S33. That is, it is determined whether or not the count value of the clapping sound counter 72h is equal to or more than the constant number of times. If "NO" in step S33, that is, if the count value of the clapping sound counter 72h is less than the constant number of times, the music playing process is directly ended. On the other hand, if "YES" in step S33, that is, if the count value of the clapping sound counter 72h is equal to or more than the constant number of times, the sound effect for cheers is output in step S35, and then, the music playing process is ended.

Figure 9:
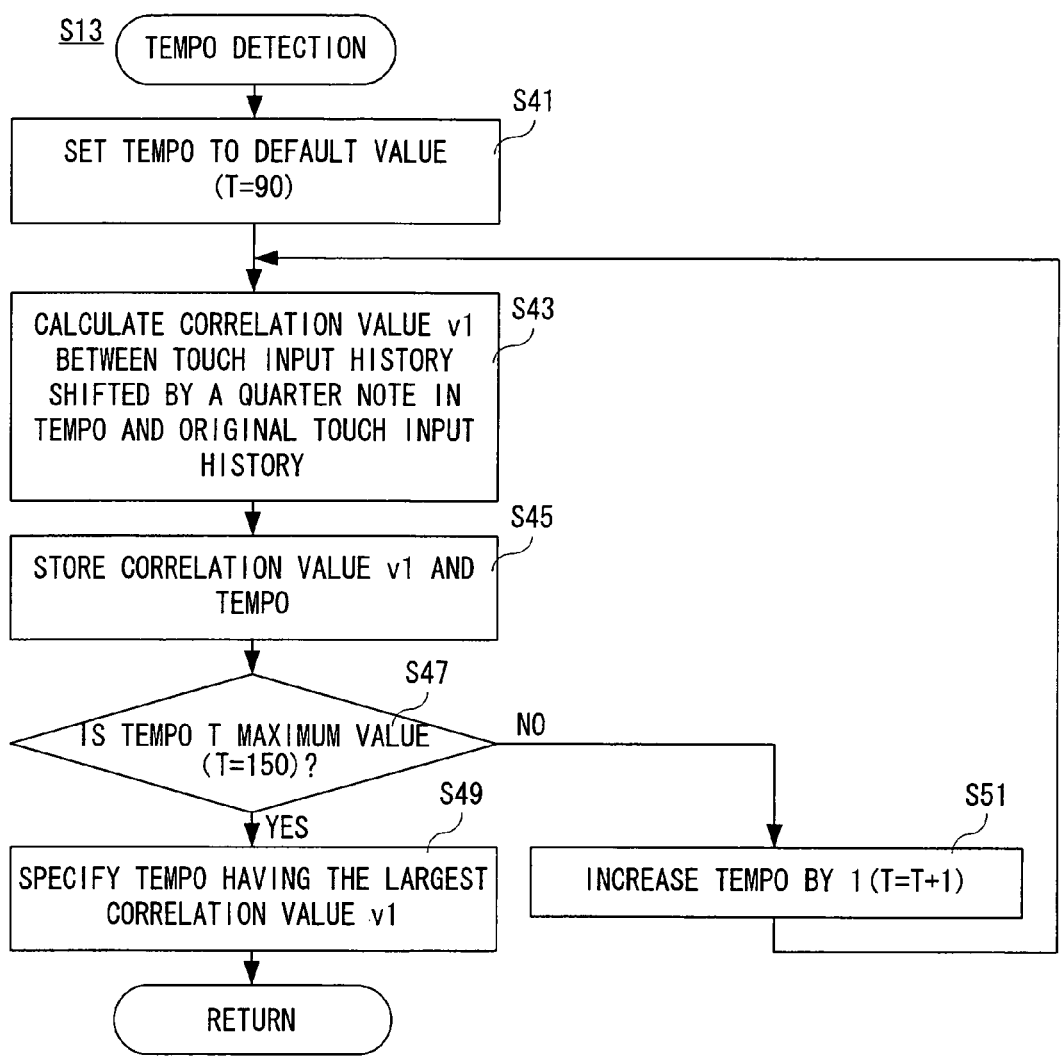
FIG. 9 is a flowchart showing a tempo detecting process of the CPU core shown in FIG. 2.

FIG. 9 is a flowchart showing a tempo detecting process in step S13 shown in FIG. 7. It should be noted that as described above, the scan time in steps S7-S31 in the music playing process is 1 frame, and therefore, the tempo detecting process is executed for each frame. As shown in FIG. 9, when starting the tempo detecting process, the CPU core 34 sets a tempo T to a default value (T=90) in step S41.

In step S43, the correlation value v1 between the touch input history (delayed history) shifted by a quarter note in the tempo T and the original history is calculated according to the equation 1. Then, in step S45, the calculated correlation value v1 and the tempo T are stored (temporarily stored) in the storage area 72 in a corresponding manner.

Next, in step S47, it is determined whether or not the tempo T is the maximum value (T=150). That is, it is determined whether or not the correlation value v1 is calculated as to all the tempos T from 90 to 150. If "YES" in step S47, that is, if the tempo T is the maximum value, the tempo T having the largest correlation value v1 is specified in step S49, and then, the tempo detecting process is returned. That is, the tempo T having the largest correlation is specified as a played tempo. On the other hand, if "NO" in step S47, that is, if the tempo T is not the maximum value, the tempo T is increased by one (T=T+1) in a step S51, and then, the process returns to step S43.

It should be noted that although illustration is omitted, when the played tempo is specified, both of the correlation value v1 and the tempo T temporarily stored in the data storage area 72 are erased.

Figure 10:
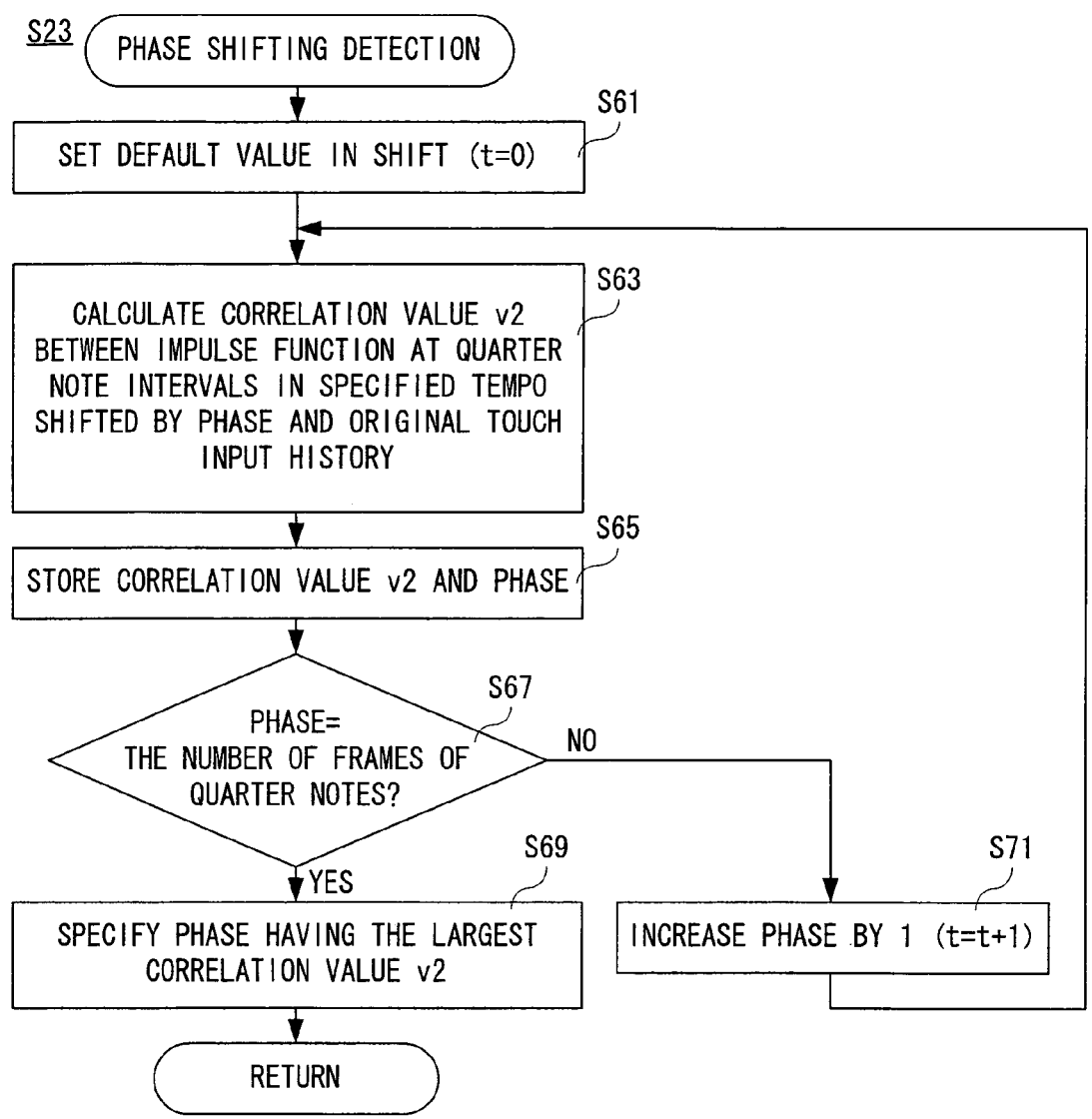
FIG. 10 is a flowchart showing a phase shifting detecting process within a quarter note of the CPU core shown in FIG. 2.

FIG. 10 is a flowchart showing the phase shifting detecting process in step S23 shown in FIG. 8. It should be noted that as described above, a scan time in the music playing process shown in steps S7-S31 is one frame, and therefore, the phase shifting detecting means is also executed for each frame. As shown in FIG. 10, when the phase shifting detecting process within the quarter note is started, a default value is set to the phase t in a step S61 (t=0). That is, the CPU core 34 brings the start timing of the quarter note decided by specified playing tempo into correspondence with the timing of the current frame.

In step S63, a correlation value v2 between the function by regarding the head of the quarter note as "1" and the rest of positions as "0" (impulse function) which is shifted by the phase and the original history is calculated according to the equation 2. Then, in step S65, the calculated correlation value v2 and the phase t are stored (temporarily stored) in the data storage area 72 in a corresponding manner.

Next, in step S67, it is determined whether or not the phase t is the number of frames corresponding to the length of the quarter note. That is, it is determined whether or not the phase t reaches the maximum number of frames. If "YES" in step S67, that is, if the phase t is the number of frames corresponding to the length of the quarter note, the phase t having the largest correlation value v2 is specified in step S69, and then, the phase shifting detecting means is returned. That is, the phase t having the largest correlation is specified as the phase shifting within quarter note. On the other hand, if "NO" in step S67, that is, if the phase t does not reach the number of frames corresponding to the length of the quarter note, the phase t is added by 1 (t=t+1) in step S71, and then, the process returns to step S63.

It should be noted that although illustration is omitted, when the phase t is specified, both of the correlation value v2 and the phase temporarily stored in the data storage area 72 are erased.

According to this embodiment, a tempo when the player freely plays is detected, and when the timing of the quarter note in the detected tempo and the timing played by the player are coincident, a sound effect is output, capable of enjoying music playing in a high entertaining element.

It should be noted that, in this embodiment, although the volume value of the clapping sound (sound effect) is changed depending on whether or not the tempo is stable, the sound effect itself can be changed. For example, if the tempo is stable, other sounds such as cheers and whistles are applied to the clapping sound to change the sound effect. In contrast, if the tempo is unstable, the clapping sound can be changed to other sound effects such as murmurs and booing.

Also, in this embodiment, although the touch panel is utilized as a pointing device, it should not be limited thereto. As another example, a computer mouse, a touch pad or a pentablet can be used. It should be noted that in such a case, a pointing image such as a mouse pointer, etc. has to be displayed on the game screen.

In addition, the feature of the game apparatus should not be limited to the above-described embodiment. For example, one LCD is appropriate, and two touch panels are respectively provided on the LCDs.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A music playing apparatus having a controller allowing a user to provide input to the music playing apparatus and a storage location storing at least sound data, comprising:
   first sound output programmed logic circuitry for outputting music from the sound data stored in said storage location in response to input from said controller;
   a history storing location for storing a history of the input from said controller in said storage location;
   playing tempo detecting programmed logic circuitry for detecting a tempo played by the user based on the history of the inputs over a predetermined time period;
   determining programmed logic circuitry for determining whether or not the tempo detected by said playing tempo detecting programmed logic circuitry and a current input have a predetermined relationship; and
   second sound output programmed logic circuitry for outputting a sound effect from the sound data stored in said storage location in dependence on the predetermined relationship, the sound effect being different from the music and the sound effect being indicative of user performance.

2. A music playing apparatus according to claim 1, wherein said playing tempo detecting programmed logic circuitry includes history comparing programmed logic circuitry for comparing, more than once, a first history of the inputs over a predetermined period and a second history obtained by shifting the first history by a delay time calculated according to a predetermined rule every different delayed time, and in generating a comparison result of said history comparing programmed logic circuitry, said tempo is detected on the basis of the delay time, the second history having the highest degree of coincidence with the first history.

3. A music playing apparatus according to claim 2, wherein said determining programmed logic circuitry determines whether or not the start timing of the duration of the quarter note in the playing tempo detected by said playing tempo detecting programmed logic circuitry and the timing of a current operation input are coincident or approximately coincident with each other.

4. A music playing apparatus according to claim 1, further comprising
   a playing tempo storing location for storing the tempo being played detected by said playing tempo detecting programmed logic circuitry in said storage location;
   playing tempo change determining programmed logic circuitry for determining whether or not the tempo stored by said playing tempo storing location continues within a constant range; and
   sound changing programmed logic circuitry for changing said sound effect in dependence on said playing tempo change determining programmed logic circuitry.

5. A computer readable storage medium storing a music playing control program of a music playing apparatus having a controller allowing a user to provide input to the music playing apparatus and a storage location storing at least sound data, wherein
   said music playing control program causes a processor of said music playing apparatus to function as:
   first sound output programmed logic circuitry for outputting music from the sound data stored in said storage location in response to input from said controller;
   a history storing location for storing a history of the inputs from said controller in said storage location;
   playing tempo detecting programmed logic circuitry for detecting a tempo played by the user based on the history of the inputs over a predetermined time period;
   determining programmed logic circuitry for determining whether or not the tempo detected by said playing tempo detecting programmed logic circuitry and a current input have a predetermined relationship; and
   second sound output programmed logic circuitry for outputting a sound effect from the sound data stored in said storage location in dependence on the predetermined relationship, the sound effect being different form the music and the sound effect being indicative of user performance.

6. A music playing control method for a music playing apparatus tangibly stored as instructions on a computer readable storage medium, the music playing apparatus having a controller allowing a user to provide input to the music playing apparatus and a storage location storing at least sound data, the method comprising:
   (a) outputting music from the sound data stored in said storage location in response to input from said controller,
   (b) storing a history of the input from said controller in said storage location,
   (c) detecting a tempo played by the user based on the history of the inputs over a predetermined period,
   (d) determining whether or not the tempo detected in step (c) and a current input have a predetermined relationship; and
   (e) outputting a sound effect from the sound data stored in said storage location in dependence on the predetermined relationship, the sound effect being different from the music and the sound effect being indicative of user performance.

7. A music playing control method according to claim 6, further comprising
   (f) comparing, more than once, a first history of the inputs over a predetermined period and a second history obtained by shifting the first history by a delay time calculated according to a predetermined rule every different delayed time; and
   (g) in generating a comparison result in step (f), detecting said tempo on the basis of the delay time, wherein the second history has the highest degree of coincidence with the first history.

8. A music playing control method according to claim 7, wherein step (g) is further practiced by determining whether or not the start timing of the duration of the quarter note in the playing tempo detected in step (c) and the timing of a current operation input are coincident or approximately coincident with each other.

9. A music playing control method according to claim 6, further comprising
   storing the tempo being played detected in step (c) in said storage location; and
   changing said sound effect in dependence on whether or not the stored tempo continues within a constant range.

* * * * *